G. W. FISHER.
Kettle.
No. 221,294.  Patented Nov. 4, 1879.
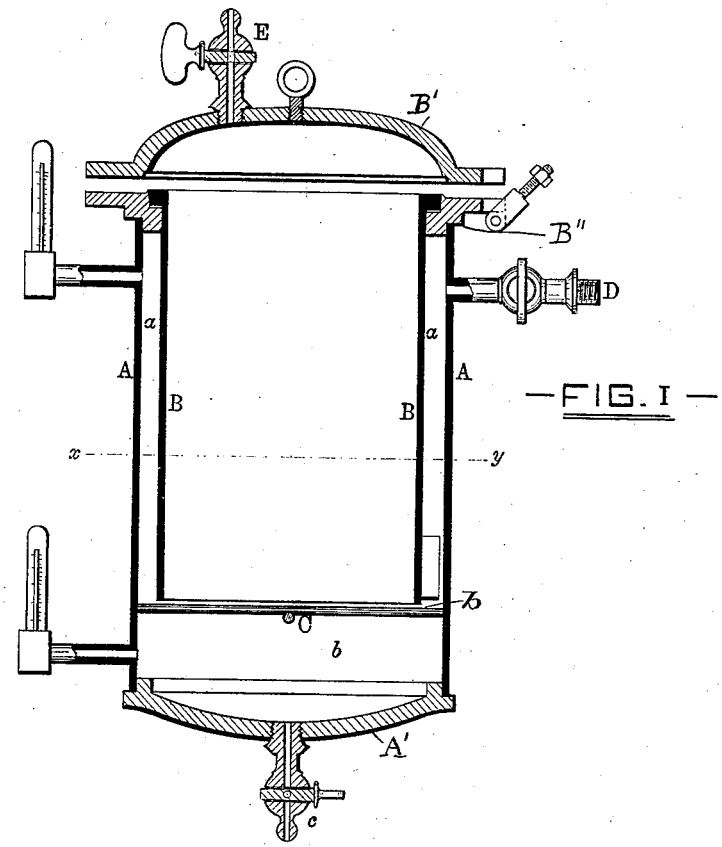
FIG. I
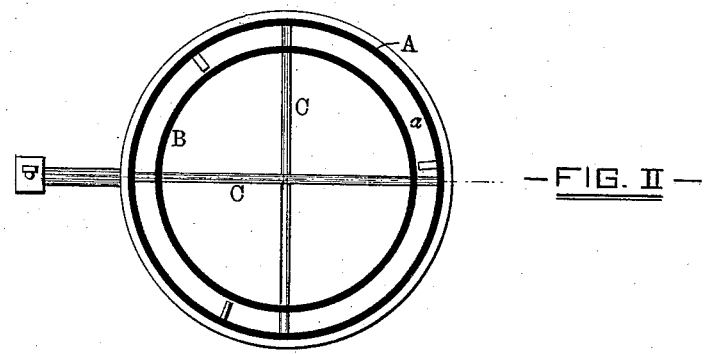
FIG. II
WITNESSES
I. Thompson
C. J. Neil
INVENTOR
George W. Fisher,
by G. H. W. I. Howard
attys.

UNITED STATES PATENT OFFICE.

GEORGE W. FISHER, OF BALTIMORE, MARYLAND.

IMPROVEMENT IN KETTLES.

Specification forming part of Letters Patent No. 221,294, dated November 4, 1879; application filed September 8, 1879.

*To all whom it may concern:*

Be it known that I, GEORGE W. FISHER, of the city of Baltimore and State of Maryland, have invented certain Improvements in Kettles used in the Packing of Canned Goods, of which the following is a specification; and I do hereby declare that in the same is contained a full, clear, and exact description of my said invention, reference being had to the accompanying drawings, and to the letters of reference marked thereon.

This invention relates to certain improvements in kettles used in the packing of hermetically-sealed or canned goods, to heat the said goods in order to partially or wholly cook them, and to expel the air contained in the cans; and it consists in the novel construction of the said kettle, whereby steam may be used as the heating medium, and so regulated as to exclude from the said kettle the water of condensation and maintain the steam, and, consequently, the canned goods contained in the kettle, at a uniform temperature for any desired length of time, as will hereinafter fully appear.

In the description of the said invention which follows, reference is made to the accompanying drawings, forming a part hereof, and in which—

Figure 1 is a sectional side view of the improved kettle. Fig. 2 is a cross-section of the kettle on the dotted line *x y*.

Similar letters of reference indicate similar parts in both views.

A is the shell of the kettle, consisting of a cylindrical or other shaped vessel, the lower end of which is permanently closed by the head A', and the upper end provided with a steam-tight removable top, B', substantially as shown in the drawings.

B is a lining, somewhat less in diameter than the shell A, secured, by resting in the ring B'', to the upper end of the shell A, and extending downward to near the bottom of the same.

This arrangement of the shell and lining forms the annular space *a* and the more roomy space *b*, which latter is the means of communication between the said annular space and the interior of the lining.

C C are bars situated below the lower end of the lining B, upon which to rest the cage containing the canned goods to be subjected to the influence of steam.

D is a steam-pipe leading from the steam-boiler, which is not shown in the drawings, to the space *a*; and E, a cock, by means of which steam is allowed to escape from the kettle.

A waste-cock, *c*, carries off water resulting from the condensation of steam in the kettle.

Parts of the invention not yet alluded to or only briefly noticed will be described and their uses fully set forth in the description of the operation of cooking or heating the canned goods in my improved kettle, which is as follows: The canned goods are placed in a suitable cage, and the loaded cage lowered upon the bars C. The kettle is then closed, and steam from the boiler admitted thereto. The steam, on entering the kettle, passes by way of the spaces *a* and *b* to the under side of the cans, and finally escapes at the top of the kettle through the cock E. The escape of the steam from the kettle is regulated so as to give the required temperature to the interior of the kettle, which temperature can be raised or lowered by merely opening or closing the cock E. The condensed steam is carried off as it is formed through the cock *c*, which, during the heating process, is left slightly open. Upon the completion of the heating process the steam from the boiler is shut off, the contents removed, another loaded cage introduced into the kettle, and the process, as before described, repeated.

I am aware that it is not new to combine an inner and an outer vessel as a cooking utensil so as to leave an annular space and also a lower space between the two vessels, and also that it is not new to provide such vessels with tops. Such a cooking utensil I do not, therefore, broadly claim; but,

Having thus described my invention, what I claim as new, and wish to secure by Letters Patent of the United States, is—

The kettle A, having the head A', ring B'', steam-pipe D, and bars C, combined with the lining B and head B', the respective heads being provided with cocks *c* and E, and spaces *a* and *b* being left between the kettle and lining, substantially as set forth.

GEORGE W. FISHER.

Witnesses:
HARRY V. ALBAUGH,
JNO. T. MADDOX.